United States Patent
Soga

(10) Patent No.: US 9,832,160 B2
(45) Date of Patent: Nov. 28, 2017

(54) DOCUMENT MANAGEMENT SYSTEM, MANAGEMENT DEVICE, DOCUMENT MANAGEMENT METHOD, STORAGE MEDIUM

(71) Applicant: CANON KABUSHIKI KAISHA, Tokyo (JP)

(72) Inventor: Masaya Soga, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 171 days.

(21) Appl. No.: 14/242,182

(22) Filed: Apr. 1, 2014

(65) Prior Publication Data

US 2014/0304345 A1   Oct. 9, 2014

(30) Foreign Application Priority Data

Apr. 8, 2013   (JP) .................................. 2013-080248

(51) Int. Cl.
*H04L 12/58*   (2006.01)

(52) U.S. Cl.
CPC .................................. *H04L 51/32* (2013.01)

(58) Field of Classification Search
CPC . H04L 51/32; H04N 1/00209; G06F 21/6218; G06F 17/24; G06F 17/30867; G06Q 10/107; G06Q 10/10
See application file for complete search history.

(56) References Cited

U.S. PATENT DOCUMENTS

| 6,701,345 | B1 * | 3/2004 | Carley | G06F 17/30368 707/999.008 |
| 7,979,788 | B2 * | 7/2011 | Tanaka | G06F 17/241 715/230 |
| 8,171,012 | B2 | 5/2012 | Soga | |
| 8,775,504 | B2 | 7/2014 | Soga | |
| 2002/0087602 | A1 * | 7/2002 | Masuda | G06F 17/217 715/255 |
| 2004/0003352 | A1 * | 1/2004 | Bargeron | G06F 17/24 715/230 |
| 2004/0246531 | A1 * | 12/2004 | Eguchi | H04N 1/00209 358/400 |

(Continued)

FOREIGN PATENT DOCUMENTS

JP   2007-249993   9/2007

*Primary Examiner* — Vivek Srivastava
*Assistant Examiner* — Muhammad Raza
(74) *Attorney, Agent, or Firm* — Fitzpatrick, Cella, Harper & Scinto

(57) ABSTRACT

A document management site registers a scan document, generates a URL of the scan document and transmits it to an image forming apparatus (an image processing apparatus), the image forming apparatus posts the registered scan document on an SNS site by using the URL of the scan document. The document management site generates a comment ticket that is control information for causing the image forming apparatus to transmit a comment about the posted content shared in the SNS site, and the image forming apparatus acquires the comment ticket from the document management site. Then, the image forming apparatus transmits the comment about the posted content and information relating to an electronic document for a comment according to the comment ticket.

8 Claims, 19 Drawing Sheets

(56) References Cited

U.S. PATENT DOCUMENTS

| | | | |
|---|---|---|---|
| 2006/0112340 A1* | 5/2006 | Mohr | G06F 17/30873 715/733 |
| 2006/0123114 A1* | 6/2006 | Aoki | H04L 12/1467 709/226 |
| 2011/0167500 A1* | 7/2011 | Ootaki | G06Q 10/107 726/28 |
| 2012/0060082 A1* | 3/2012 | Edala | G06F 17/241 715/231 |
| 2012/0191776 A1* | 7/2012 | Ruffner | G06F 17/30873 709/204 |
| 2012/0290410 A1* | 11/2012 | Hershenson | G06Q 30/0603 705/14.73 |
| 2013/0006952 A1* | 1/2013 | Wong | G06F 17/30867 707/706 |
| 2013/0031455 A1* | 1/2013 | Griffiths | G06F 17/241 715/230 |
| 2013/0050730 A1 | 2/2013 | Soga | |

\* cited by examiner

FIG. 9A

| 801 | 802 | 803 | 804 | 805 | 806 |
|---|---|---|---|---|---|
| document ID | document name | update day and time | SNS post URL | device information | user ID |
| D001 | A company quotation | 2012/7/1 9:00 | http://SNSServer.com/postdoc_a | 211.10.36.148 | U001 |

FIG. 9B

| 807 | 808 | 809 |
|---|---|---|
| user ID | user name | affiliation group |
| U001 | UserA | GroupB |

DOCUMENT MANAGEMENT SYSTEM, MANAGEMENT DEVICE, DOCUMENT MANAGEMENT METHOD, STORAGE MEDIUM

BACKGROUND OF THE INVENTION

Field of the Invention

The present invention relates to a document management system, a management device, a document management method, and a storage medium.

Description of the Related Art

There has been proposed a document management system that uses an Internet technology. In the document management system, documents scanned by an image forming apparatus such as a multifunctional peripheral, and documents created by a client PC are stored and managed in a storage server on a cloud. Also, by using SNS (Social networking service) that is one among information sharing sites, the processing is conducted in which documents scanned by an image forming apparatus and documents created by a client PC are shared and managed inside a project, a group, or the like.

Share processing is also performed in which the document management system and the SNS cooperate each other so as to share the document saved in the document management system in the NS. The SNS refers to SNS inside a company to be used by the company for facilitating in-house communication (for example, Chatter (Registered)), general SNS in which information is shared without regard to inside and outside the company (for example, Facebook (Registered)), and the like.

By using the SNS, another user can transmit a comment about a document posted by a certain user. For example, when a certain user scans a quotation and posts it for sharing, the processing may be conducted in which another helpful quotation is scanned as a comment from another user about the posted quotation transmitted to SNS as well as a comment text. In the case where that comment is transmitted, conventionally a user transmits and saves the document that has scanned with the image forming apparatus, then operates the client PC, selects the document, and transmits a comment about the posted quotation in SNS by attaching the document. In this case, the user is required to operate both the image forming apparatus and the client PC, which leads to an increase of processes when the comment is transmitted by attaching the document.

Japanese Patent Laid-Open No. 2007-249993 discloses a system that automatically creates a comment when an instruction for transferring an image has been made from a facsimile server that functions as an image forming apparatus to an electronic billboard server that functions as an information sharing site.

However, when the system disclosed in Japanese Patent Laid-Open No. 2007-249993 is applied, a user confirms a content posted on the information sharing site on a screen and the like of the client PC, and determines a posted content for which a comment is required. Then, the user is required to go in front of the image forming apparatus, again display/confirm the posted content on the information sharing site, select the post that is the comment transmission target, and transmit the comment. In other words, when the system disclosed in Japanese Patent Laid-Open No. 2007-249993 is applied and a comment to the content posted on the information sharing site is transmitted, the user has to duplicate the similar procedure. Also, in the system disclosed in Japanese Patent Laid-Open No. 2007-249993, only one information sharing site exists to which a comment can be transmitted from the image forming apparatus, the image forming apparatus is incapable of easily transmitting a comment to the plurality of the information sharing sites (for example, SNS).

SUMMARY OF THE INVENTION

The document management system according to the present invention ensures that a comment with respect to a posted content in the information sharing site is transmitted to the information sharing site with a simple operation.

A document management system according to one embodiment of the present invention includes an image processing apparatus and a management device that communicates the image processing apparatus via a network. The management device includes a registration unit configured to register an electronic document; a first generation unit configured to generate document specifying information for specifying the registered electronic document and transmit the registered electronic document to the image processing apparatus; and a second generation unit configured to generate control information for causing the image processing apparatus to transmit a comment about shared information in an information sharing site. The image processing apparatus comprises: a display unit configured to acquire the control information from the management device and display it; a third generation unit configured to generate an electronic document for a comment and transmit the electronic document for the comment to the management device according to control information selected from among the displayed control information; a receiving unit configured to receive the document specifying information generated by the first generation unit about the electronic document for the comment; and a comment posting unit configured to post, on the information sharing site, the document specifying information for the electronic document for the comment received by the receiving unit and the comment about the shared information.

Further features of the present invention will become apparent from the following description of exemplary embodiments (with reference to the attached drawings).

BRIEF DESCRIPTION OF THE DRAWINGS

FIG. 9A and FIG. 9B are diagrams illustrating document attribution information and user information.

DESCRIPTION OF THE EMBODIMENTS

Figure 1:
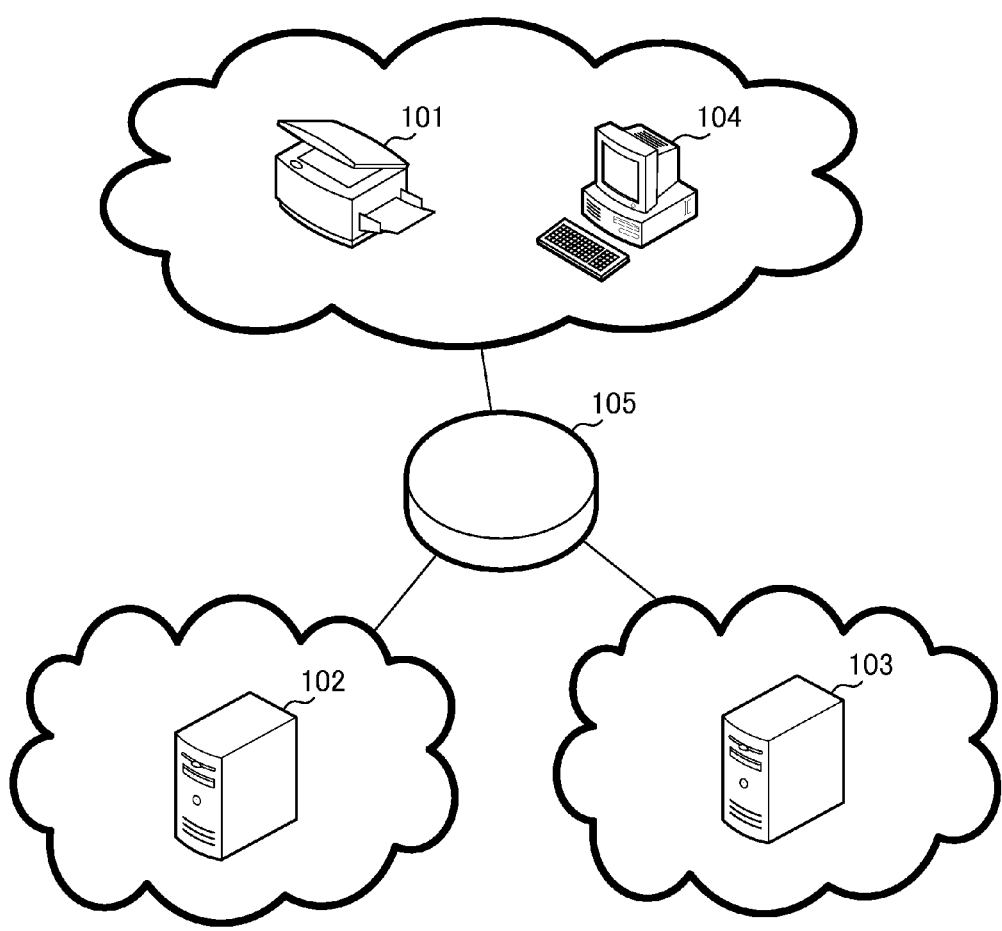
FIG. 1 is a diagram illustrating an example of a system configuration in the present embodiment.

FIG. 1 is a diagram illustrating an example of a document management system configuration in the present embodiment. The document management system shown in FIG. 1 includes an image forming apparatus (image processing apparatus) 101, a client PC 104, a document management site 102, and an SNS site 103. The document management site 102 means a server device (a document management device) that realizes the pertinent document management site. The SNS site 103 means a server device that realizes an SNS site. The SNS site is an example of an information sharing site. The information sharing site is a Web site that realizes information sharing between users. Utilization of the information sharing site enables sharing of information (information (e.g. blog entries, articles, tweets and so on)) posted by unspecified number of users on a server on the network between the unspecified number of users. Note that each site may be configured with one or more server devices.

The image forming apparatus 101 and the client PC are an information processing apparatus placed in a user environment. The image forming apparatus 101, the client PC 104, the document management site 102, and the SNS site 103 are connected with each other through a network 105. Although each device is shown one by one in FIG. 1, each device may be configured with a plurality of devices. The document management site 102 store a document scanned by the image forming apparatus 101, and the SNS site 103 displays the document stored in the document management site 102.

Figure 2:
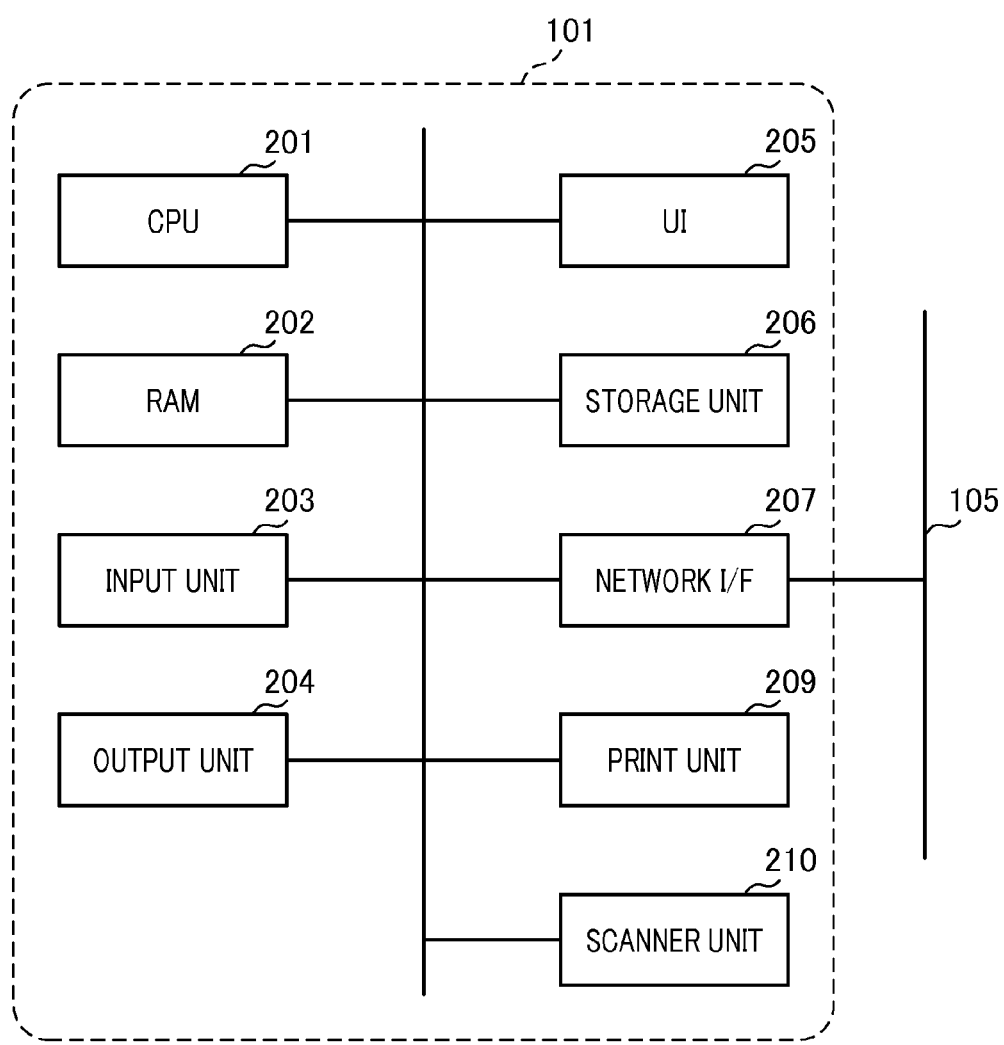
FIG. 2 is a diagram illustrating an example of a hardware configuration of an image forming apparatus.

FIG. 2 is a diagram illustrating an example of a hardware configuration of the image forming apparatus. The image forming apparatus 101 includes a CPU 201, a RAM 202, an input unit 203, an output unit 204, a UI 205, a storage unit 206, a network I/F 207, a print unit 209, and a scanner unit 210. CPU is an abbreviation for "Central Processing Unit". RAM is an abbreviation for "Random Access Memory".

The CPU 201 executes various programs and controls overall the image forming apparatus 101. The CPU 201 loads programs into the RAM 202 so as to execute them. For example, the CPU 201 generates an electronic document by executing image processing. The RAM 202 is used as a temporary working memory area for the CPU 201. The input unit 203 is an interface unit that receives data from a pointing device (not shown). The output unit 204 is an interface unit that transmits data to a connected UI (User Interface) 205.

The storage unit 206 is a device that stores various data. The network I/F 206 is a unit that connects the image forming apparatus 101 to the network 105. The image forming apparatus 101 carries the print unit 209, and the print unit can transmit/receive data to/from each unit. The print unit 209 can print a raster image on a storage medium. The scanner unit 210 can transmit/receive data to/from each unit. Note that the scanner unit 210 can input an image. Although the image forming apparatus in the present embodiment is explained as a multifunctional peripheral including the scanner unit 210 and the print unit 209, the print unit 209 is not an essential configuration in the present invention. In other words, an image processing apparatus without the print unit (such as a scanner dedicated apparatus) can realize the present invention.

Figure 3:
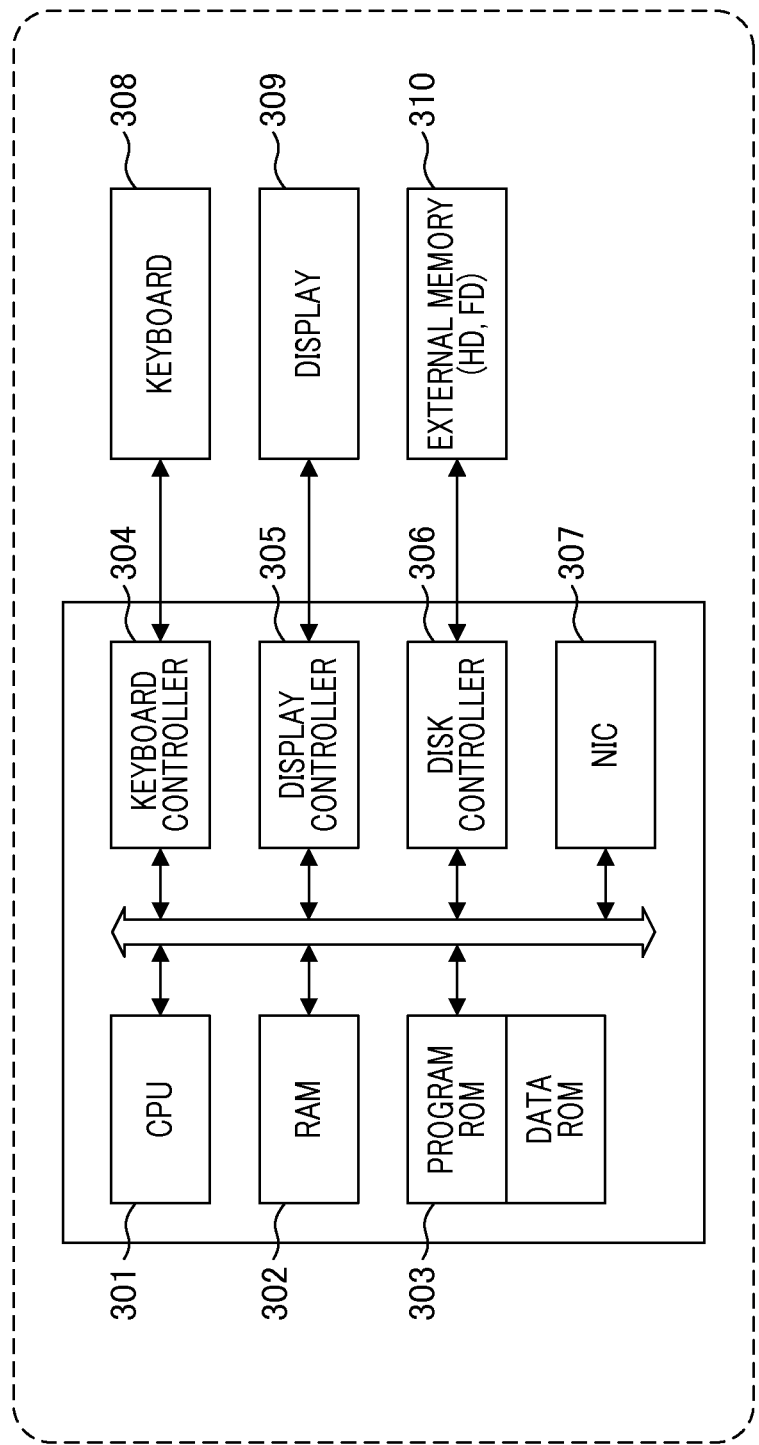
FIG. 3 is a diagram illustrating examples of hardware configurations of a document management site and an SNS site.

FIG. 3 is diagrams illustrating examples of hardware configurations of the document management site and the SNS site. A computer that realizes the document management site and the SNS site includes a CPU 301 to an external memory 310 as shown in FIG. 3.

The CPU 301 controls overall the computer. The CPU 301 loads computer programs into the RAM 302 so as to execute them. The RAM 302 is a unit that is used as a temporary working memory area for the CPU 301. The ROM 303 is a unit that stores various programs and data. A keyboard controller 304 is an interface unit that receives an input key from a keyboard 308.

A display controller 305 is an interface unit that transmits data to a connected display 309. A disk controller 306 is an interface unit that transmits/receives data from/to the external memory 310 that stores various data. An NIC (Network Interface Card) 307 is a unit for connecting the document management site 102 and the SNS site 103 to the network 105.

Figure 4:
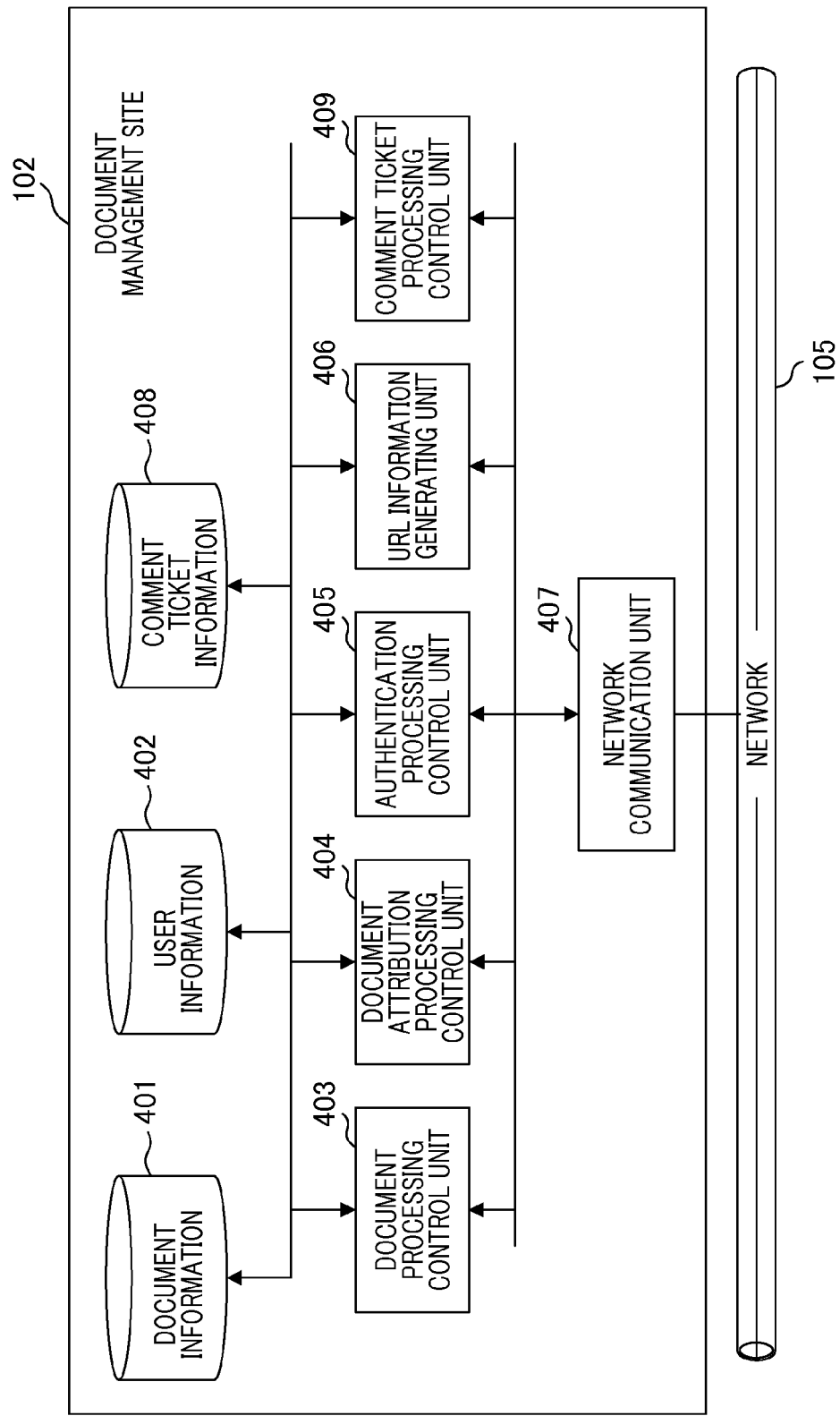
FIG. 4 is an example of a functional block diagram of the document management site.

FIG. 4 is an example of a functional block diagram of the document management site. The document management site 102 includes a document information database (DB) 401, a user information DB 402, a document processing control unit 403, and a document attribution processing control unit 404. The document management site 102 also includes an authentication processing control unit 405, a URL information generating unit 406, a network communication unit 407, a comment ticket information DB 408, and a comment ticket processing control unit 409.

The document information DB 401 is a storage unit that stores document data and document attribution information. The document processing control unit 403 conducts processing to document data. The document attribution processing control unit 404 sets document attribution information and stores it in the document information DB 401. The user information DB 402 is a storage unit for storing use information. The authentication processing control unit 405 performs authentication processing upon user login. The authentication processing control unit 405 acquires user information from the user information DB 402 and performs user authentication processing by using the acquired user information.

Figure 5:
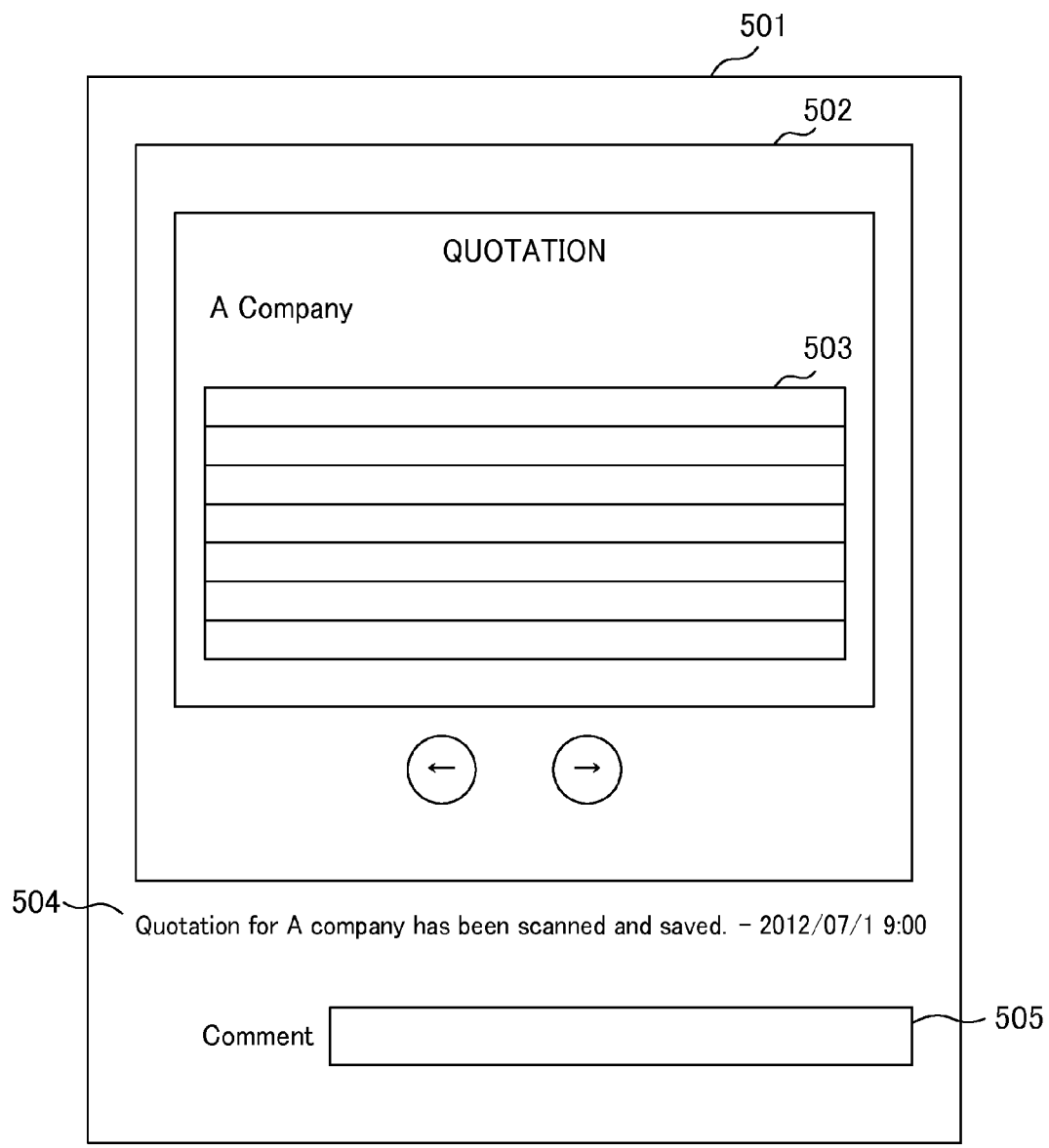
FIG. 5 is a display example of the posted content.

The URL information generating unit 406 is a first generation unit that generates a URL of the document stored in the document information DB 401 as document specifying information so that the document is displayed by the SNS site 103. The document URL is information for specifying a location of the registered electronic document inside the document management site 102. The generated document URL is used when the document is posted on the SNS site 103. A user transmits a post text and the document URL upon posting the document on the SNS site 103 through the image forming apparatus 101, so that the posting including a display of the document can be realized. When the user performs the posting including the display of the document, the SNS site 103 displays the posted content as seen in FIG. 5.

When the browser 501 access the SNS site 103, the SNS site 103 displays a document display area 502 and a post text 504. The document 503 stored in the document management site 102 and a button for turning pages of the document are displayed on the document display area 502. The processing in the document display area 502 is performed on the document management site side. By posting the document URL on the SNS site 103, actual data is not managed by the SNS site 103, the SNS site 103 displays the document managed by the document management site 102 by using the document URL. When the user transmits a comment with respect to this posted content from the browser 501, the comment is input in a comment text inputting area 505.

The comment ticket processing control unit 409 is a storage unit in which the comment ticket is stored. The comment ticket is control information for instructing a comment transmission to the SNS site 103. In this example, when the user presses the button displayed on the image forming apparatus 101, the comment is simply transmitted to the SNS site according to the comment ticket. The comment ticket processing control unit 409 is a second generation unit that performs generation/control of the comment ticket.

The aforementioned each processing unit provided on the document management site 102 transmits/receives data from/to each device by connecting to the network 105 through the network communication unit 407.

Figure 6:
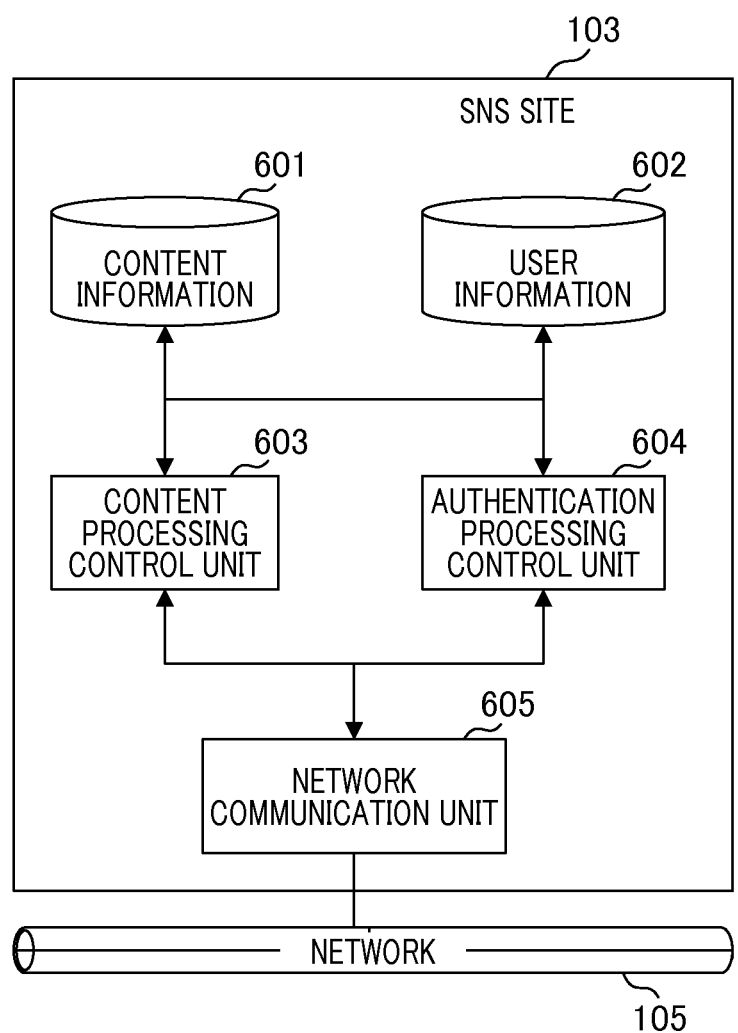
FIG. 6 is an example of a functional block diagram of the SNS site.

FIG. 6 is an example of a functional block diagram of the SNS site. The SNS site 103 includes a content information DB 601, a user information DB 602, a content processing control unit 603, an authentication processing control unit 604, and a network communication unit 605.

The content information DB 601 is a storage unit in which a content such as a posted content, a comment and the like is stored. The content processing control unit 603 stores a posted content or content data in the content information DB 601 so as to control the content data.

The user information DB 602 is a storage unit in which user information (for example, confirmation information such as a user ID and a password) is stored. The authentication processing control unit 604 acquires user information for a user when the user logs into the SNS site 103 so as to perform authentication processing based on the acquired user information. The respective processing units connect to the network 105 via the network communication unit 605 so as to exchange data with each device.

Note that, the configuration of the SNS site 103 is not limited to above but any configuration other than the above configuration is available as long as the SNS site 103 includes a unit for managing contents such as a posted content, a comment and the like, and is accessible from external software. Although only one SNS site is employed in this embodiment, plural SNS sites may be employed.

(Registration Processing for Scanned Document with Document Management Site and Post Processing to SNS Site)

A description will be given of registration processing for a scanned document with the document management site and post processing for posting the scanned document by transmitting a URL of the registered scanned document to the SNS site 103 in this embodiment with reference to FIG. 7 to FIG. 9. The scanned document is electronic document data obtained by scan processing (reading processing). In this embodiment, registration of the scanned document from especially the image forming apparatus 101 shown in FIG. 1, but the registration may be replaced with registration of the document in the client PC 104.

Figure 7:
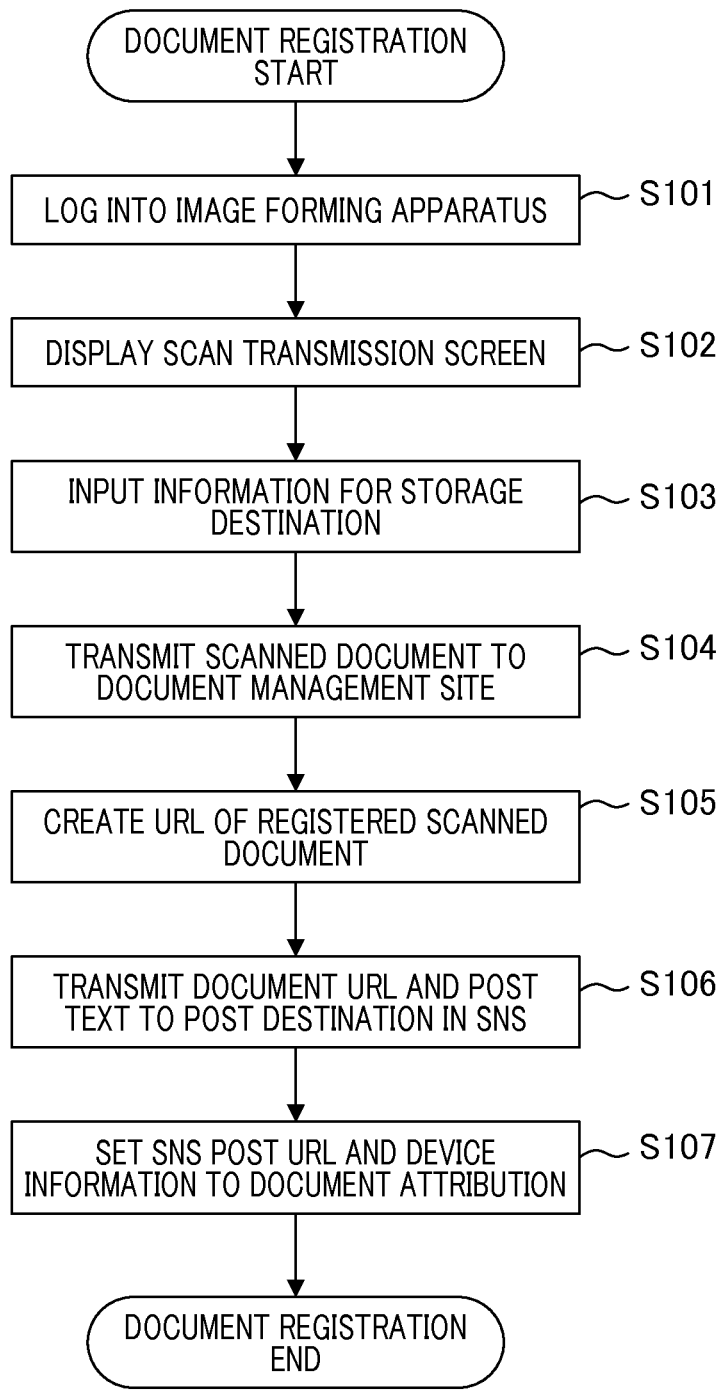
FIG. 7 is a diagram explaining an example of registration processing for the scanned document from the image forming apparatus.

FIG. 7 is a flowchart explaining an exemplary registration processing for the scanned document from the image forming apparatus. In S101, a user inputs user information using the UI 205 of the image forming apparatus 101 so as to log into the image forming apparatus 101. Subsequently, in S102, the image forming apparatus 101 displays a scan transmission screen on the UI 205. The scan transmission screen is an operation screen for instructing transmission of the scanned document. In S103, the image forming apparatus 101 accepts inputs, by the user, of information for a storage destination of the scan document.

Figure 8:
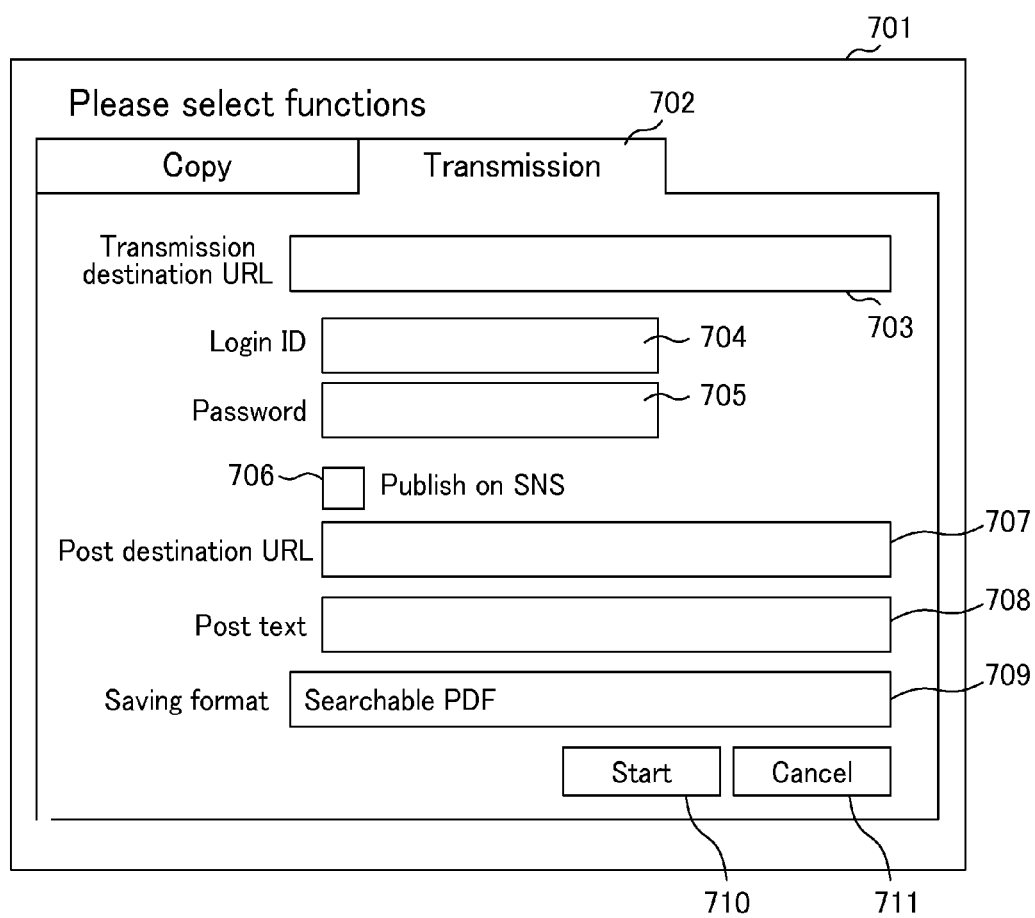
FIG. 8 is a diagram illustrating a scan transmission screen example.

FIG. 8 is a diagram illustrating an example of the scan transmission screen. The image forming apparatus 101 displays the scan transmission screen 701 in the state where a scan transmission tab 702 is selected. A destination URL 703 is a column for inputting and setting a URL (a storage destination URL) of the document management that is a storage destination of the document. In other words, the storage destination URL is device specifying information for specifying a location of the document management site 102. A login ID 704 is a column for an input setting of a login ID for connecting to the document management site 102.

A password 705 is a column for an input setting of user information. When a login user of the image forming apparatus 101 and a login user of the document management site 102 are associated with each other, the input setting of the password 705 can be omitted.

An SNS publication check box 706 is a column to be utilized when a URL of the document stored in the document management site 102 is posted on the SNS site 103. When the URL of the scanned document stored in the document management site 102 is posted on the SNS site 103, the user checks and changes the box 706 to be ON. At this time, the user inputs a URL of the SNS site to a post destination URL 707. The user also inputs a text to be posted to a post text 708.

A saving format 709 is an item for selecting a type of the document to be stored in the document management site 102. The user presses the button 710 upon starting a scan transmission, whereas the user presses a cancel button upon cancelling the processing.

Returning to FIG. 7, in S104, the image forming apparatus 101 scans the document in response to a press of the button 710 by the user, and transmits the scanned document to the document management site 102. The document management site 102 performs user authentication by using the input login information or login information associated with the login information for the image forming apparatus 101.

Next, in S105, the document management site 102 receives the scanned document through the network communication unit 407, and the document processing control unit 403 stores the scanned document in the document information DB 401. Then, the URL information generating unit 406 generates a document URL, and transmits it to the image forming apparatus 101.

In S106, the CPU 201 provided in the image forming apparatus 101 transmits/posts the document URL received from the document management site 102 and the post text input to the post text 708 to/on SNS site 103. In other words, the CPU 201 functions as a posting unit that posts the electronic document registered with the document management site on the SNS site (the information sharing site) by using the document URL transmitted from the document management site 102.

Next, the SNS site 103 receives the document URL and the post text. Then, the content processing control unit 603 performs post processing by using the document URL and the post text. Then, the SNS site 103 transmits an SNS post URL to the image forming apparatus 101. The SNS post URL is post specifying information for specifying a post location of the posted document inside the SNS site. The SNS post URL is used for accessing the content posted on the SNS site 103.

Figure 10:
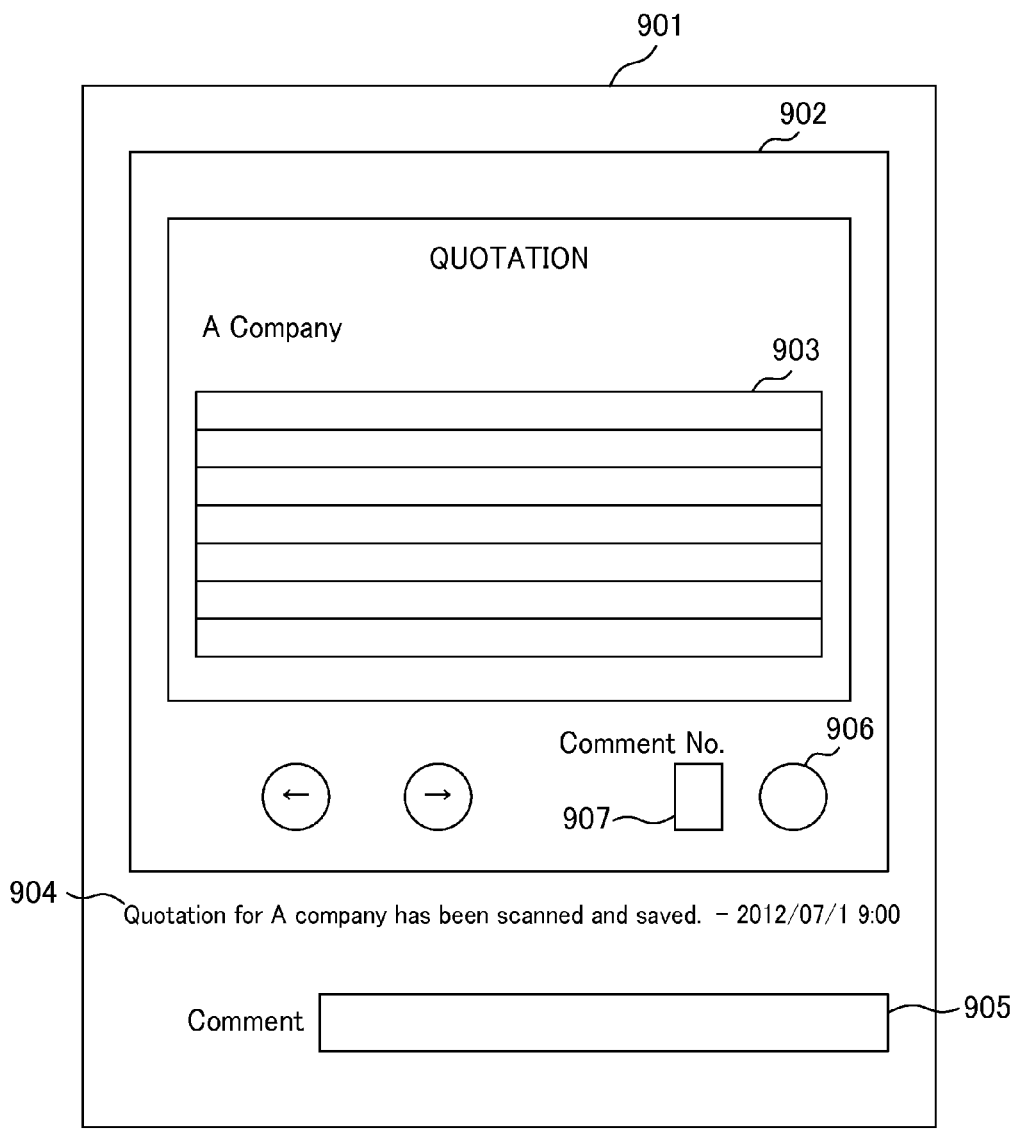
FIG. 10 is a diagram illustrating a display example of post content by a browser.

When the user accesses the SNS site 103 by using the browser of the client PC 104 and the browser acquires the posted content from the SNS site 103 and displays it, a screen shown in FIG. 10 is displayed.

Returning to FIG. 7, in S107, the image forming apparatus 101 transmits the SNS post URL received in S106 and information (including an IP address for access) for the image forming apparatus 101 to the document management site 102. Then, the document attribution processing control unit 404 of the document management site 102 sets the SNS post URL and information for the image forming apparatus 101 to attribution information of the scanned document stored in S105 and manages them.

FIG. 9 is a diagram illustrating examples of document attribution information and user information managed by the document management site. FIG. 9A illustrates document attribution information. The document attribution information includes a document ID 801, a document name 802, an updated day and time 803, an SNS post URL 804, and device information 805. The document ID 801 indicates identification information of the document. The document name 802 indicates a name of the document. The updated day and time 803 indicates a day and time when the document is updated. The SNS post URL 804 indicates the SNS post URL received in S107. The device information 805 indicates an IP address of the image forming apparatus 101. In this embodiment, since the SNS post URL for each document is settable, the document management is enabled even if the plurality of SNS sites is used.

FIG. 9B indicates user information. The user information includes a user ID 807, a user name 808, and an affiliation group 809. The user ID 807 indicates identification information of a user. The user name 808 indicates a name of the user. The affiliation group 809 indicates a group to which the user belongs. The aforementioned document attribution information and user information are used upon creation of a comment ticket described below.

(Comment Ticket Creation Processing)

Next, a description will be given of the processing for creating a comment ticket to be used when a user transmits a comment as well as a scanned document about a post in the SNS site 103.

Figure 11:
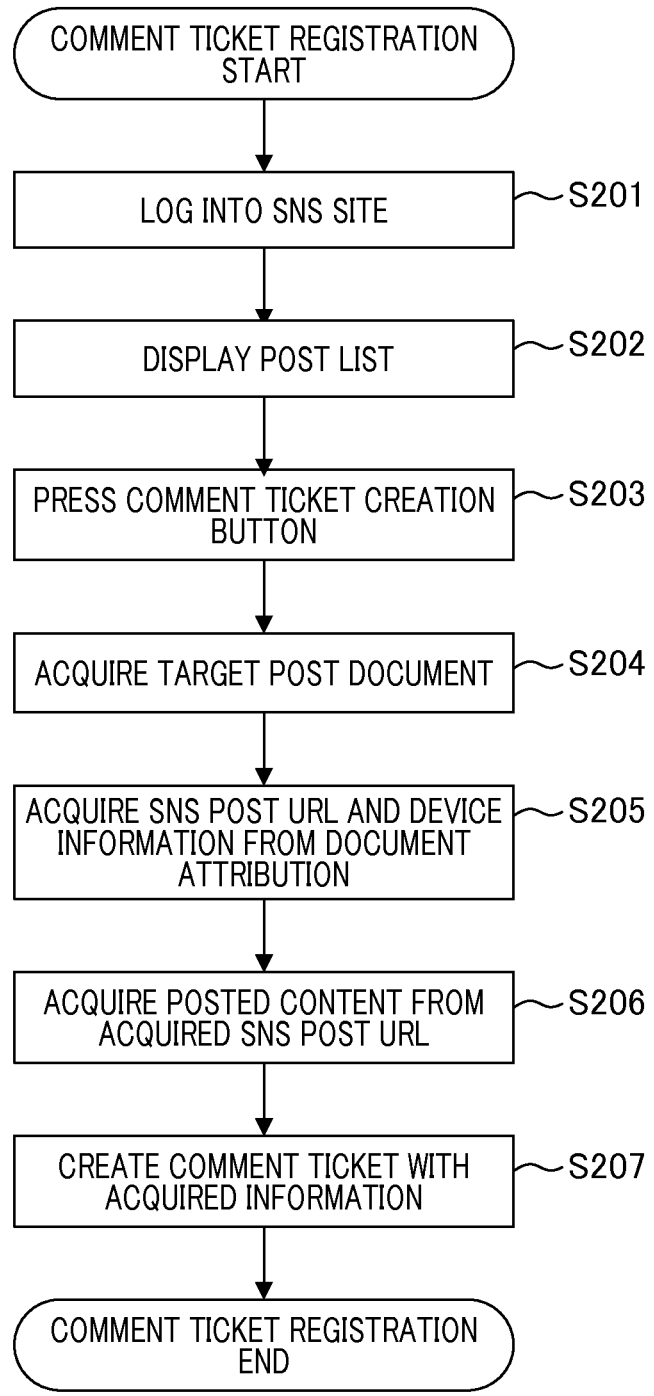
FIG. 11 is a diagram explaining comment ticket creation processing.

FIG. 11 is a flowchart explaining the comment ticket creation processing in this embodiment. In S201, the user accesses the SNS site 103 by using the browser of the client PC 104, inputs user information, and logs into the SNS site (S201).

Next, in S202, the browser acquires a list of posted contents that have been posted on the SNS site 103 based on user information for the login user, and displays the list. Each item of the posted content is shown as FIG. 10. In the example shown in FIG. 10, one item of posted content is displayed by using the browser 901, and here, the items of content of the document display area 902, the document display 903, the post text 904, the comment text inputting area 905 are the same as those of reference numerals 502 to 505 in FIG. 5 as stated above. In this embodiment, when the user wants to transmit the comment accompanied with the scanned document about the posted content in the SNS site 103, a comment ticket creation button 906 and a comment number inputting area 907 are used. When the user designates the comment ticket creation button 906, a comment ticket creation instruction is transmitted to the document management site 102.

That is, when the user wants to transmit the comment along with the scanned document about the posted content item being displayed in S203 of FIG. 11, the user presses the comment ticket creation button 906. The processing in the case where the comment ticket creation button 906 being displayed on the document display area 902 is pressed is performed not on the SNS site 103 side, but on the document management site 102 side. Note that, in the comment transmission processing using the comment ticket, when the user comments by utilizing a comment that has been input to the SNS site 103 in advance, the user inputs its comment number to the comment number inputting area 907. For example, when a top comment among comments transmitted to the posted content is considered as No. 1, the user inputs "1" to the comment number inputting area 907 when the top comment is utilized.

Next, in S204, the document attribution processing control unit 404 of the document management site 102 specifies the document based on the document URL of the document of which the comment ticket creation button 906 has been pressed, and acquires a storage destination URL and a document attribution of the document. When the comment number has been input, the document attribution processing control unit 404 also acquires that number.

In S205, the comment ticket processing control unit 409 acquires an SNS post URL and device information from the document attribution acquired in S204. In S206, the comment ticket processing control unit 409 acquires the posted text posted on the SNS site 103 based on the SNS post URL acquired in S205. For example, the comment ticket processing control unit 409 acquires a text corresponding to the post text 904 shown in FIG. 10.

Next, in S207, the comment ticket processing control unit 409 creates a comment ticket and stores it in the comment ticket processing control DB 409. The comment ticket processing control unit 409 creates the comment ticket by using the storage destination URL of the document, the SNS post URL, the device information, and the posted text which have been acquired in S204 to S206. When the comment number has been acquired in S204, the comment ticket processing control unit 409 also stores the comment number together in the comment ticket processing control DB 409.

Figure 12:
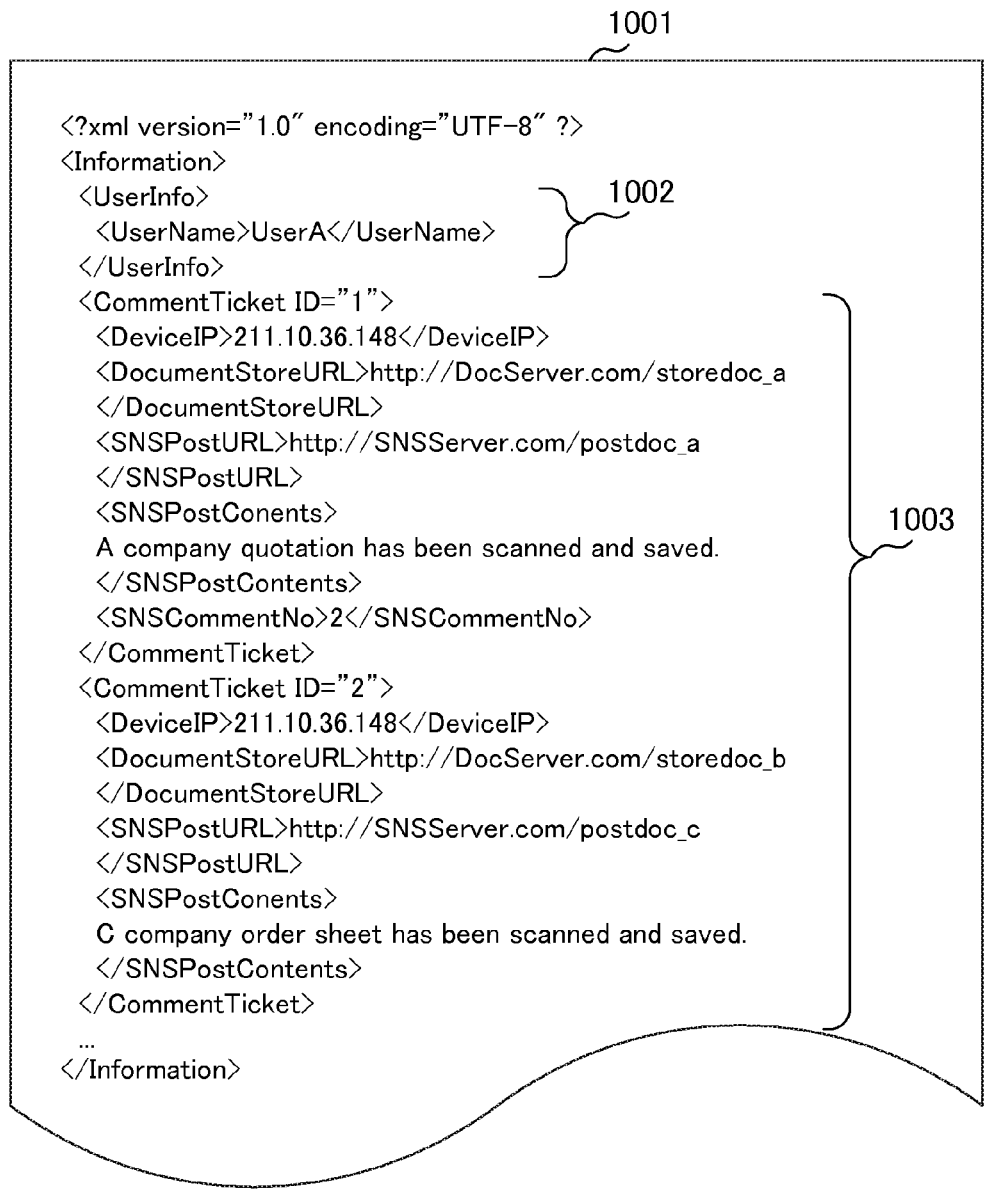
FIG. 12 is a diagram illustrating a configuration example of a comment ticket.

FIG. 12 is a diagram illustrating an exemplary configuration of the comment ticket. Although the comment ticket shown in FIG. 12 is described by an XML, the description language is not limited thereto as long as a format is capable of representing of structured data of the comment ticket. The comment ticket 1001 includes user information 1002 and comment ticket information 1003. User information of a user who requested a creation of the comment ticket is described in the user information 1002, and the user whose name is described there can use the comment ticket. Device information, the storage destination URL of the document, the SNS post URL, the posted content in the SNS site 103, and the comment number for each comment ticket are described in the comment ticket information 1003. That is, the comment ticket processing control unit 409 acquires the posted and scanned document attribution information from the document attribution processing control unit 404. Then, the comment ticket processing control unit 409 generates the comment ticket in which at least the SNS post URL included in the acquired attribution information, the storage destination URL when the scanned document was registered are set.

(Comment Registration Processing to SNS Site)

Next, a description will be given of comment registration processing for registering, with the SNS site 103, the scanned document obtained by scanning the document by using the image forming apparatus 101 as well as the comment. In the comment registration processing, firstly the CPU 201 of the image forming apparatus 101 acquires, from the document management site 102, the comment ticket created in the processing described with reference to FIG. 11 and displays it on the screen. For achieving this purpose, the comment ticket processing control unit 409 of the document management site 102 transmits the comment ticket among the comment ticket information DB as a display target to the image forming apparatus 101. The user selects a comment ticket from among the comment tickets displayed on the screen, and performs registration of the scanned document with the document management site 102 and transmission of the scanned document URL and the comment to the SNS site 103. Hereinafter, a detailed description will be given of the comment registration processing.

Figure 13:
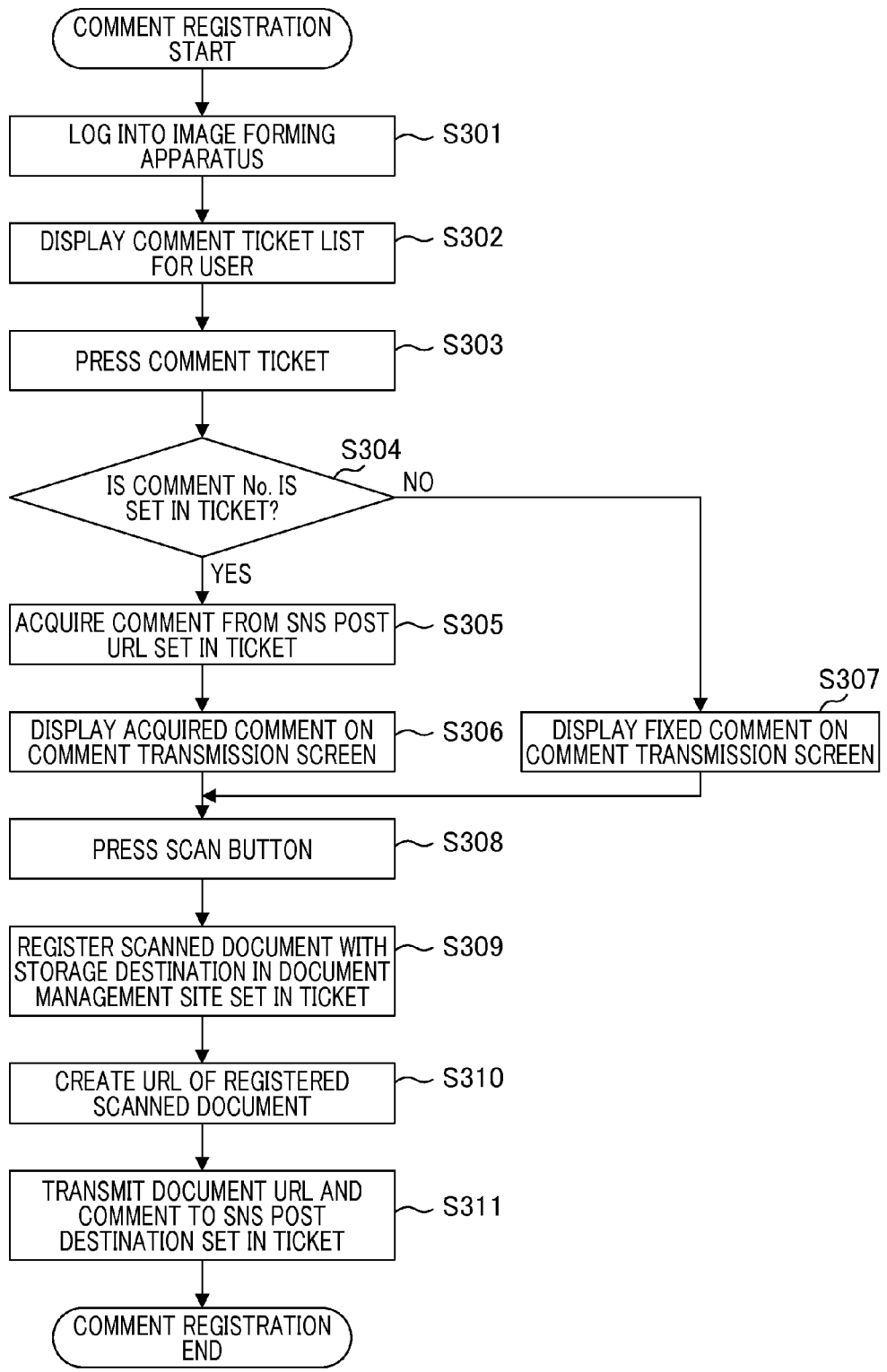
FIG. 13 is a diagram explaining an example of comment registration processing to the SNS site.

FIG. 13 is a flowchart explaining an exemplary comment registration processing at the SNS site. In S301, the user inputs user information by using the UI 205 of the image forming apparatus 101, performs the authentication processing, and logs into the image forming apparatus 101.

Next, in S302, the image forming apparatus 101 acquires the comment ticket created in S207 of FIG. 11 from the document management site 102 according to an operation by the login user, and displays it.

Figure 14:
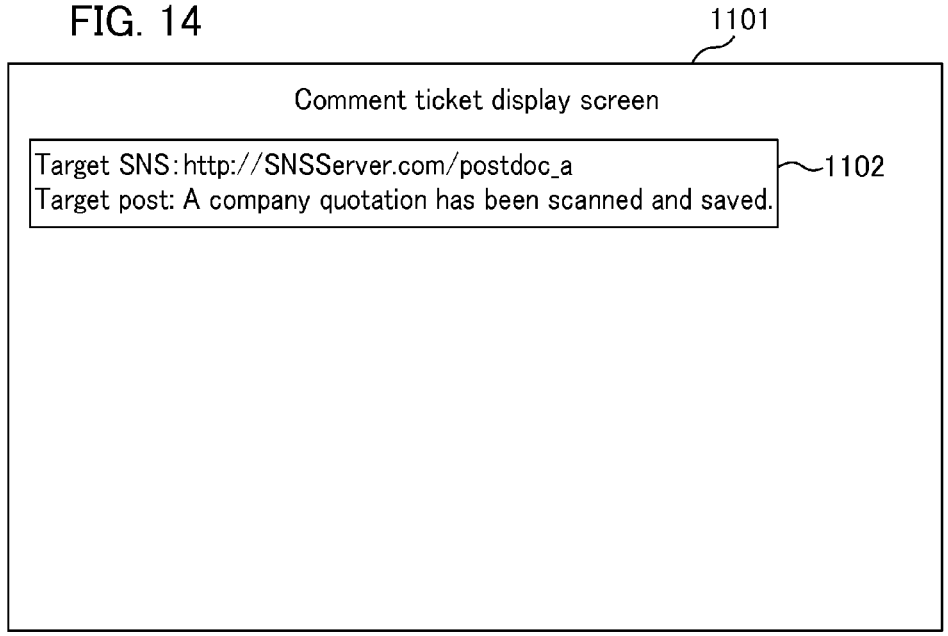
FIG. 14 is a screen display example of a comment ticket.

FIG. 14 is an example of a screen display of the comment ticket. The image forming apparatus 101 displays the comment ticket 1102 which the login user can use on the comment ticket display screen 1101. In this example, the image forming apparatus 101 displays the comment ticket created in S207 of FIG. 11. When plural comment tickets are acquired, the plural comment tickets are displayed. The image forming apparatus 101 displays the SNS site (target SNS site) URL of the comment transmission destination, and the posted content thereon (target post) in the display area for the comment ticket 1102. Since the comment ticket 1102 is displayed in a button format, the user clicks/presses the comment ticket 1002 for using the comment ticket.

In S303, the user selects and presses the comment ticket to be used from the comment ticket list displayed on the comment ticket display screen 1101. Next, in S304, the image forming apparatus 101 determines whether a comment number is set in the comment ticket pressed in S303.

When the comment number is set in the comment ticket, the process advances to S305. When the comment number is not set in the comment ticket, the process advances to S307. In S305, the image forming apparatus 101 acquires a comment input in advance from the SNS site 103 by using the SNS post URL and the comment number set in the comment ticket.

In S306, the image forming apparatus 101 displays a comment transmission screen including the comment acquired in S305.

Figure 15:
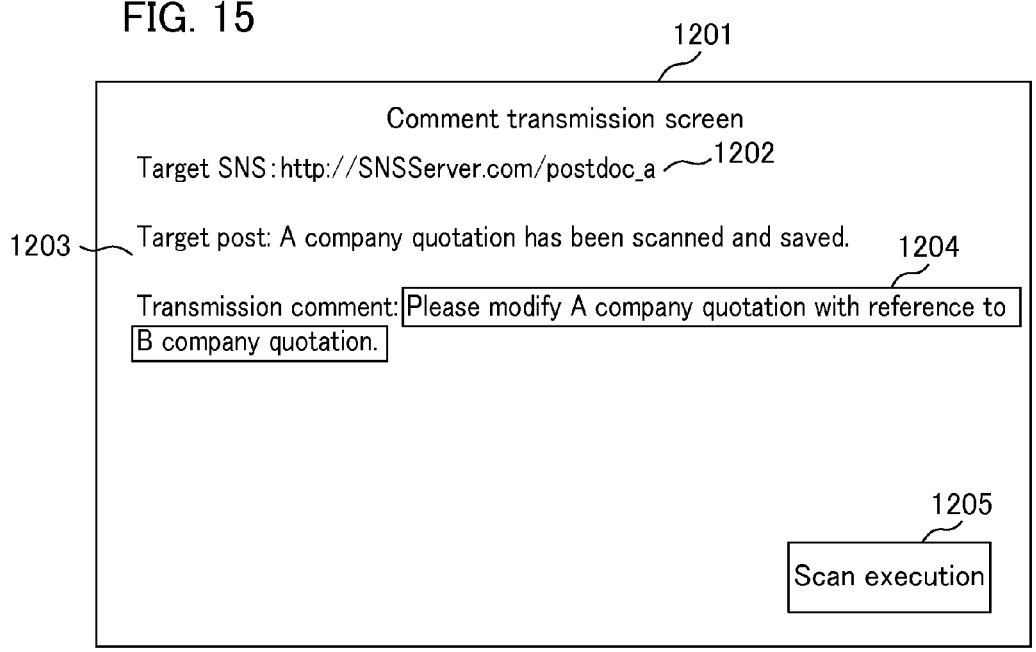
FIG. 15 is a display example of a comment transmission screen.

FIG. 15 is a display example of the comment transmission screen. The image forming apparatus 101 displays the following information on a transmission comment display column on the comment transmission screen 1201. The image forming apparatus 101 displays the SNS site URL of the comment transmission destination set in the comment ticket selected on the comment ticket display screen, the posted content thereon, and the comment acquired in S305. A reference numeral 1202 indicates the URL of the SNS site. A reference numeral 1203 indicates the posted content. A reference numeral 1204 indicates the transmission comment display column. Note that the user can select the comment described in the transmission comment display column and edit it.

In S307, the image forming apparatus 101 displays the comment transmission screen including a fixed comment. That is, the image forming apparatus 101 displays the fixed comment on the transmission comment display column 1204 on the comment transmission screen 1201 shown in FIG. 15. The user can select the fixed comment described in the transmission comment display column 1204 and edit it with texts input via a keyboard and the like.

In S308, the user presses the scan transmission button 1205 on the comment transmission screen displayed in S306 or S307. Subsequently, in S309, the CPU 201 of the image forming apparatus 101 scans the document so as to generate a scanned document. Then, the CPU 201 registers the scanned document with the document management site 102 by using the storage URL of the document set in the comment ticket. In other words, the document processing control unit 403 of the document management site 102 registers the scanned document received from the image forming apparatus 101 with the document information DB 401.

In S310, the URL information generating unit 406 of the document management site 102 generates a URL of the scanned document registered in S309 and transmits it to the image forming apparatus 101. The image forming apparatus 101 receives the URL of the scanned document. The URL of the scanned document is a URL to be used for display of the scanned document by the SNS site 103.

Next, in S311, the CPU 201 of the image forming apparatus 101 executes the following processing by using the SNS post URL set in the comment ticket. The CPU 201 transmits, to the SNS site 103, the URL of the scanned document received in S310, and the comment set in S306 or S307. That is, the CPU 201 transmits, to the SNS site 103, the comment about the posted content of the scanned document according to the selected comment ticket. In this manner, the comment accompanied with the generated electronic document (accompanied with the scanned document) is transmitted to the SNS site 103. The user who transmits the comment is the login user to the SNS site 103 who is associated with the user logged into the image forming apparatus 101.

Figure 16:
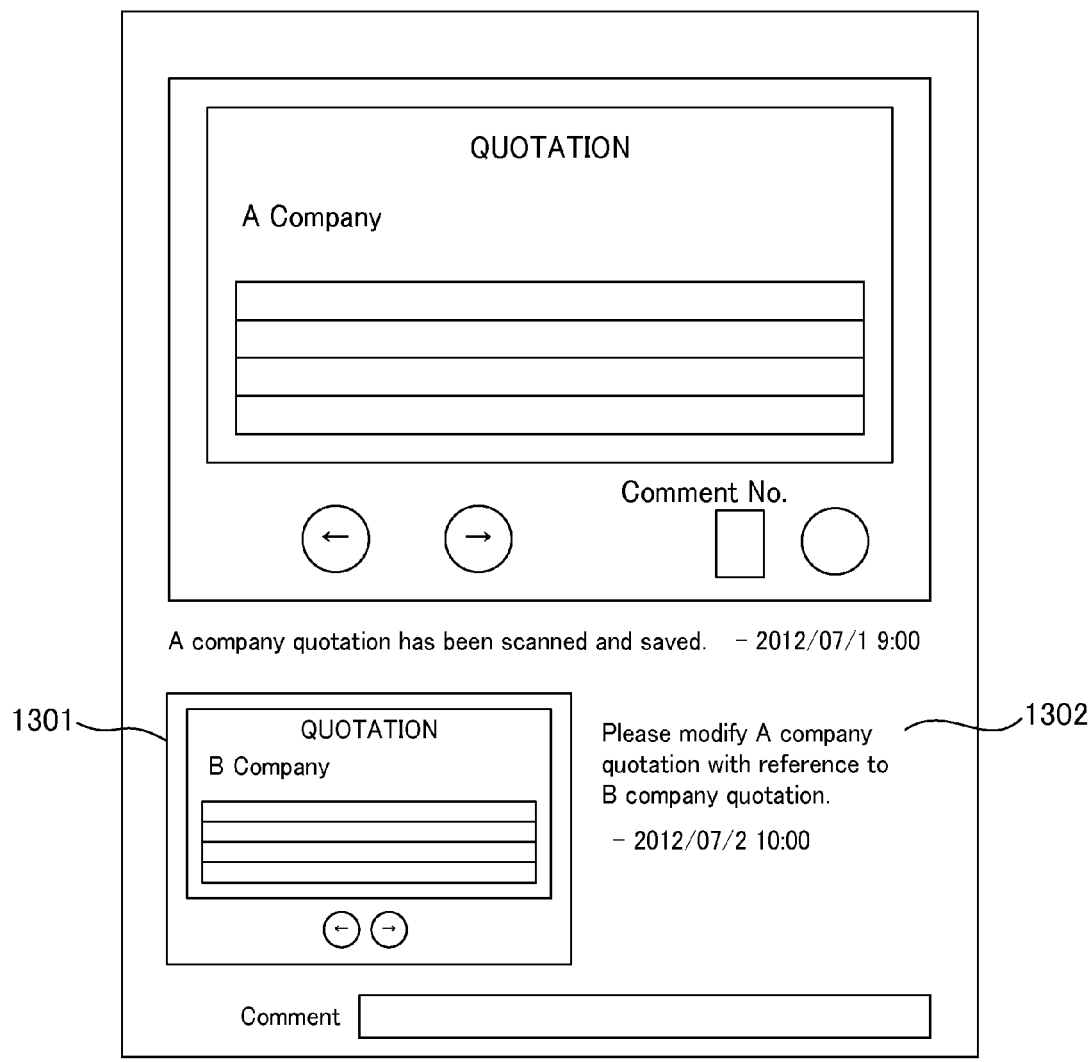
FIG. 16 is a display example of a comment transmitted to the SNS site.

FIG. 16 is a display example of the comment that has been transmitted to the SNS site. The SNS site 103 displays the scanned document transmitted along with the comment on the document display column 1301 as well as displaying the transmitted comment 1302.

In the first embodiment, the user can confirm the posted content on the SNS through the client PC 104, and perform a creation instruction for the comment ticket at that time. The document management site 102 generates the comment ticket in response to the creation instruction, and the image forming apparatus 101 displays it on the screen. Then, only the comment ticket selection by the user on the screen of the image forming apparatus 101 enables the comment transmission about the content posted on the SNS. Thus, according to the document management system in the first embodiment, the comment about the content posted on the information sharing site as well as the scanned document can be transmitted to the information sharing site with a simple operation.

Second Embodiment

In the document management system in a second embodiment, the document management site 102 automatically generates the comment ticket for each fixed period of time. A configuration of the document management system in the second embodiment is the same as that of the document management system in the first embodiment.

Figure 17:
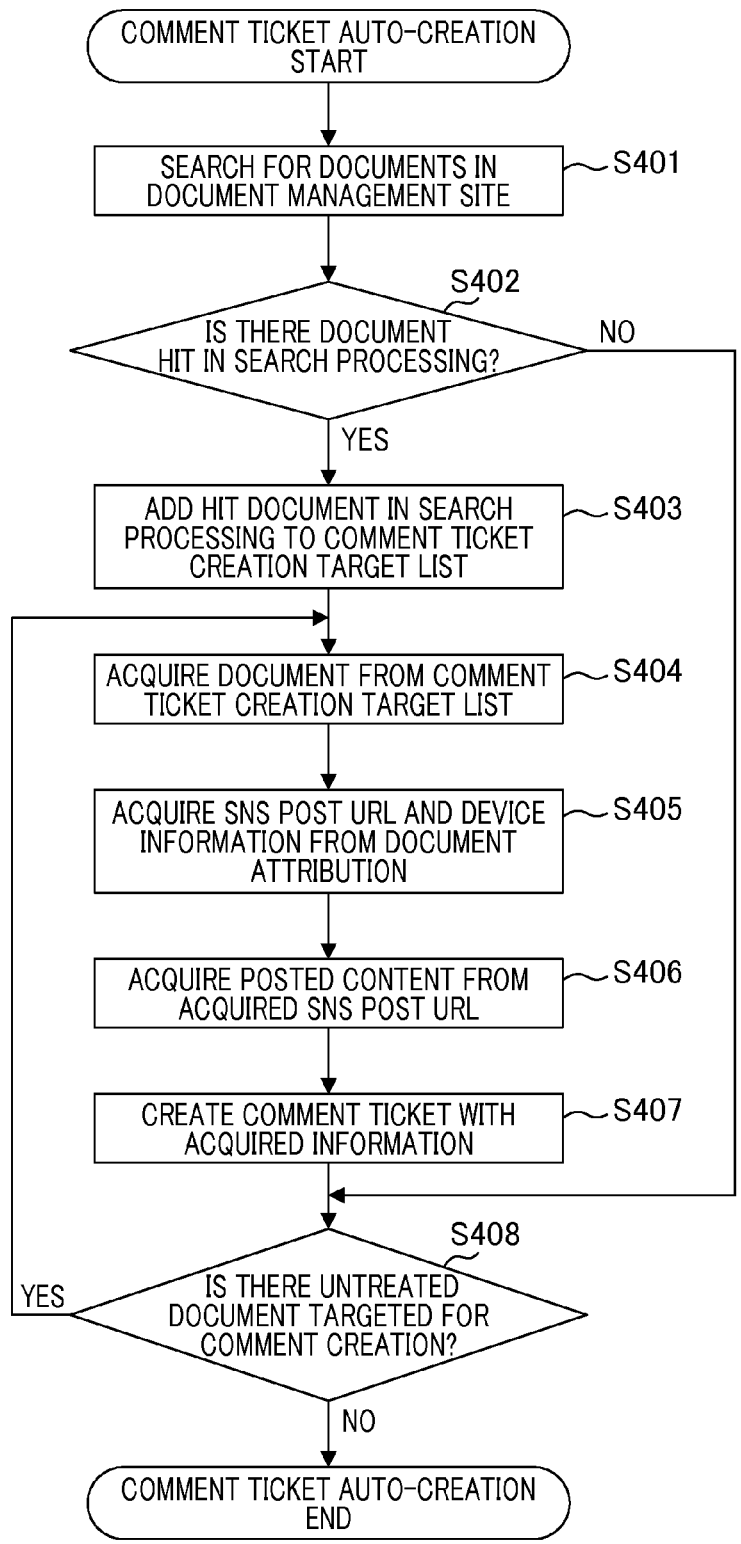
FIG. 17 is a diagram explaining an example of comment ticket auto creation processing.

FIG. 17 is a flowchart explaining an exemplary auto creation processing for the comment ticket in the second embodiment.

Firstly, in S401, the document processing control unit 403 of the document management site 102 searches for a document for which an update date is within the fixed/predetermined period of time from among the documents stored in the document information DB 401. The document processing control unit 403 searches for documents that have been updated within the fixed period of time, for example, one day, three days and the like, which has been preset by a user/manager. Note that, the document processing control unit 403 treats only documents for which a value is input in the corresponding document attribution information of the SNS post URL as a search target.

In S402, the document processing control unit 403 determines whether there is a document hit in the search processing of S401. When there is no document hit in the search processing, the processing ends. When there is a document hit in the search processing, the processing advances to S403.

In S403, the document processing control unit 403 adds the hit document(s) in the search processing to the comment ticket creation list. Subsequently, in S404, the document attribution processing control unit 404 acquires one document from the comment ticket creation list, and further acquires a storage destination URL of that document and a document attribution.

Next, in S405, the comment ticket processing control unit 409 acquires an SNS post URL and device information from the document attribution acquired in S204. Subsequently, in S406, the comment ticket processing control unit 409 acquires the post text posted on the SNS site 103 from the SNS post URL acquired in S405. For example, the comment ticket processing control unit 409 acquires a text corresponding to the post text 904 shown in FIG. 10

Next, in S407, the comment ticket processing control unit 409 creates a comment ticket by using the storage destination URL, the SNS post USL, the device information, and the posted text which have been acquired in S404 to S406. Then, the comment ticket processing control unit 409 stores the created comment ticket in the comment ticket information DB 408.

Next, the document attribution processing control unit 404 determines whether there remains an unprocessed document for a comment ticket creation target (S408). When there remains the unprocessed document for the comment ticket creation target, the processing returns to S404. When there remains no unprocessed document for the comment ticket creation target, the processing ends. According to the processing described with reference to FIG. 17, the comment ticket can be automatically and periodically created.

Figure 18:
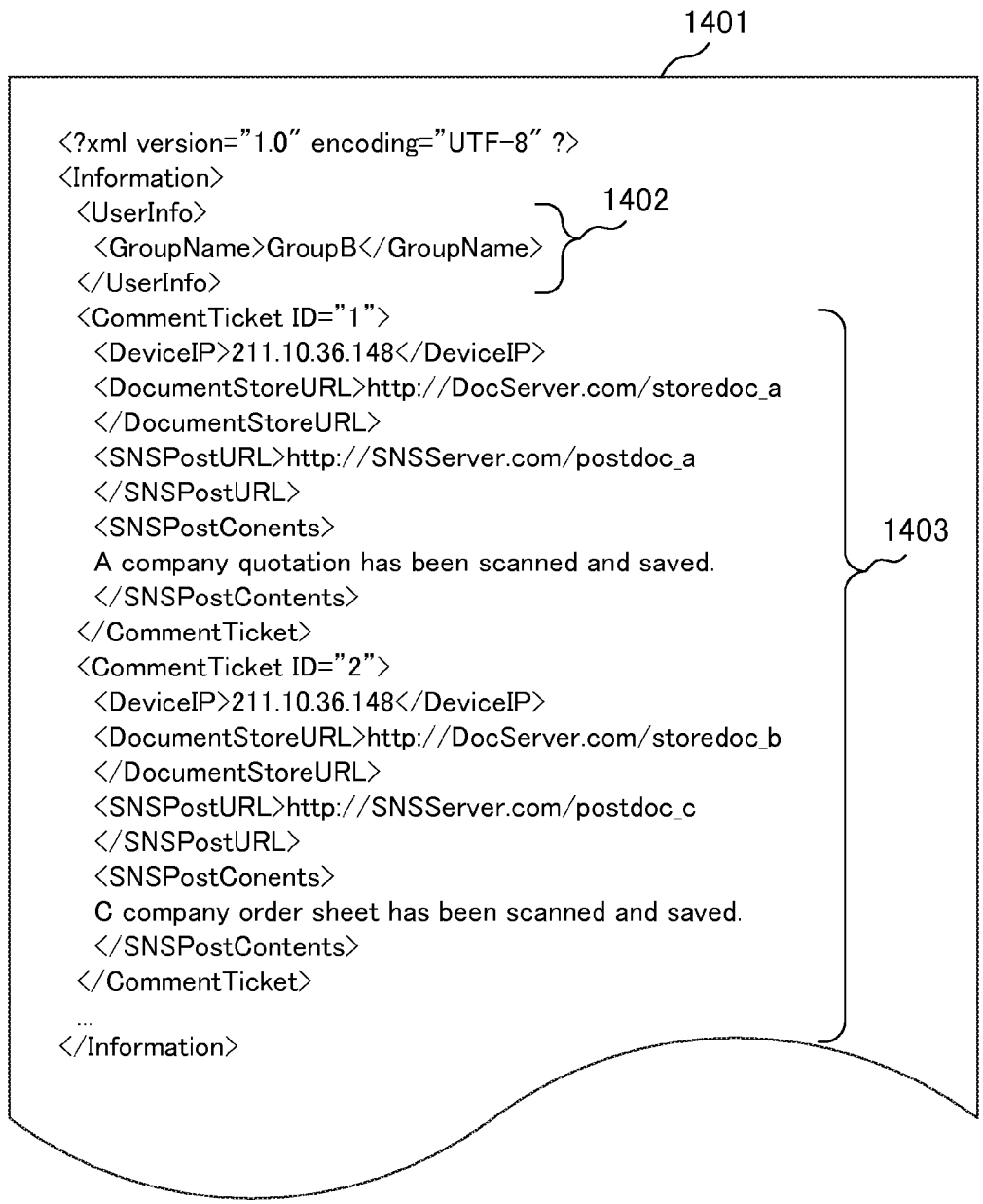
FIG. 18 is a diagram illustrating a configuration example of a comment ticket.

FIG. 18 is a diagram illustrating a configuration example of the comment ticket created by the document management site in the second embodiment. The comment ticket 1401 includes user information 1402 and comment ticket information 1403. User information of a user who can use the comment ticket is described in the user information 1402. When the comment ticket is created for each group in the comment ticket auto creation processing, a group to which a user belongs is described in user information 1402. The user who belongs to the group described here can use the comment ticket. The device information, the document storage destination URL, the SNS post URL, and the posted content on the SNS site 103 are described to the comment ticket information 1403 for each comment ticket.

Figure 19:
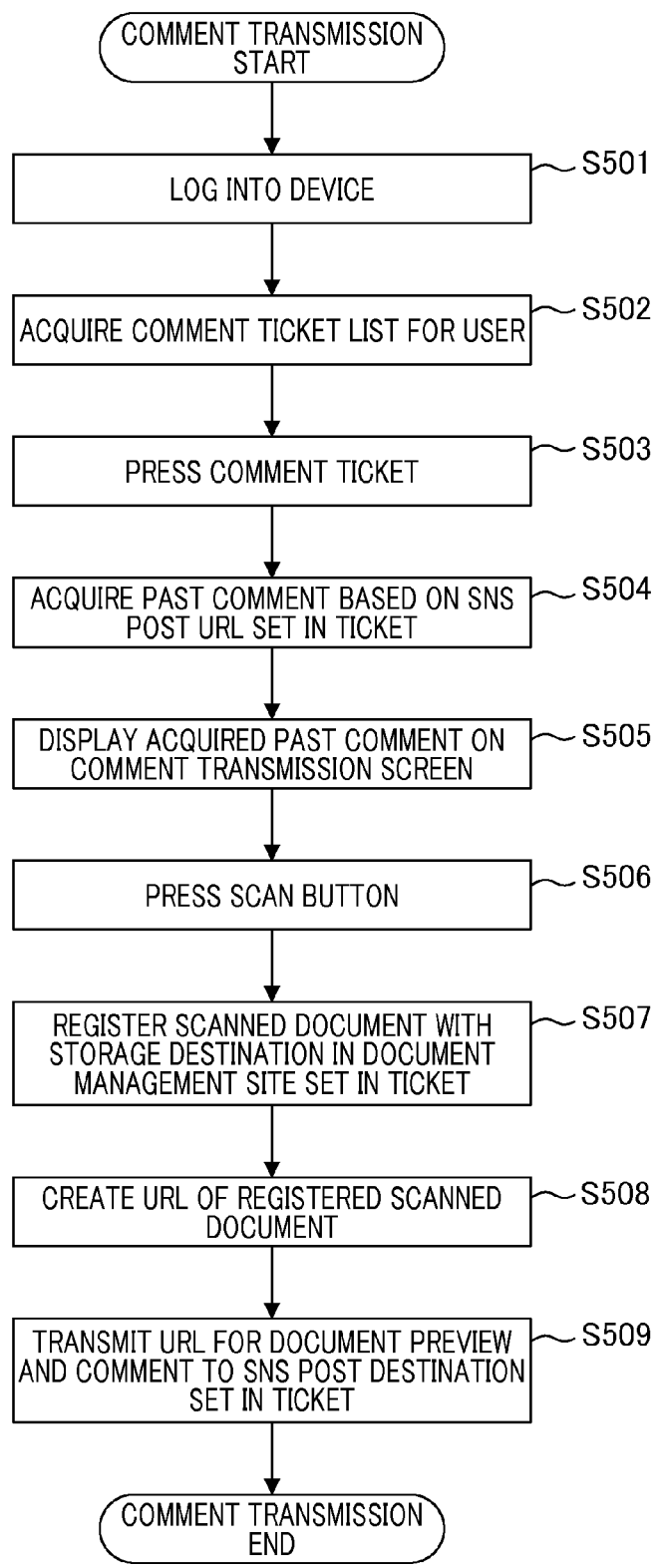
FIG. 19 is a diagram explaining comment transmission processing.

FIG. 19 is a flowchart explaining the comment transmission processing in the second embodiment. The processing in S501 to S503 in the second embodiment is the same as that in S301 to S303 in FIG. 13.

Figure 20:
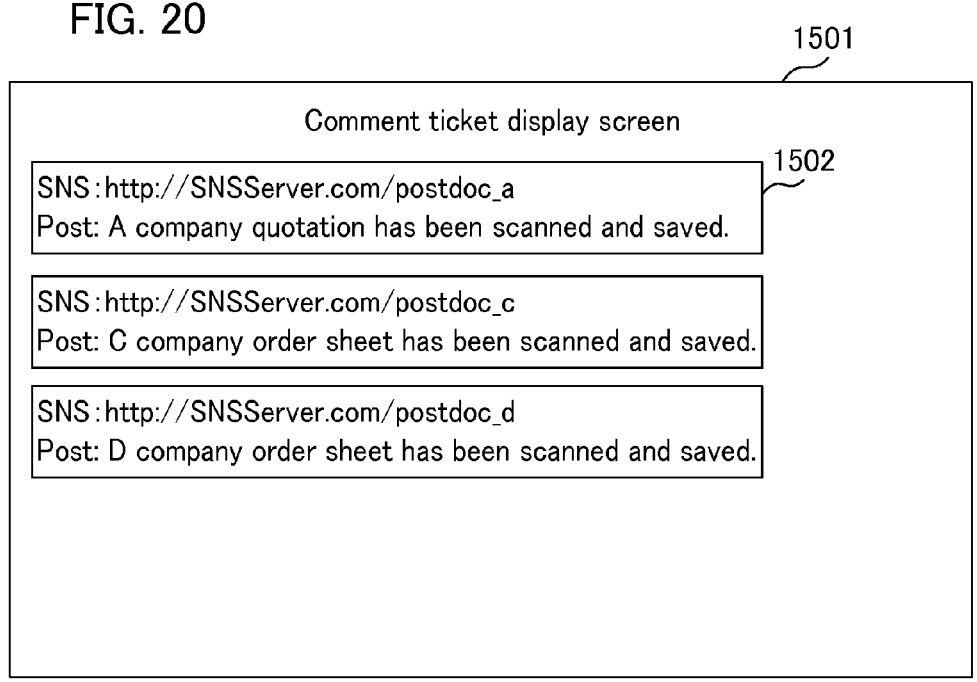
FIG. 20 is a diagram illustrating a display example of a comment ticket list.

FIG. 20 is a diagram illustrating a display example of the comment ticket list acquired in S502. The image forming apparatus 101 acquires and displays the comment ticket list corresponding to the login user. The comment ticket 1502 that the login user can use is displayed on the comment ticket display screen 1501. In this example, the comment ticket 1502 created in S407 of FIG. 17 is displayed.

The image forming apparatus 101 displays the URL of the comment transmission destination SNS site (a target SNS) and the posted content thereon (a target posting) are displayed on the display area of the comment ticket 1502. Since the comment ticket 1502 is displayed in the button format, the user presses and uses the comment ticket 1502 to be desirable to comment.

In S503, the user selects a comment ticket to be used from among the comment tickets displayed on the comment ticket display screen 1501 and presses the comment ticket. In S504, the image forming apparatus 101 acquires, from the SNS site 103, the comments that have been transmitted about the posted content in the past by using the SNS post URL set in the comment ticket that has been pressed in S503. In S505, the CPU 201 of the image forming apparatus 101 displays the comment transmission screen including the comment acquired in S504.

Figure 21:
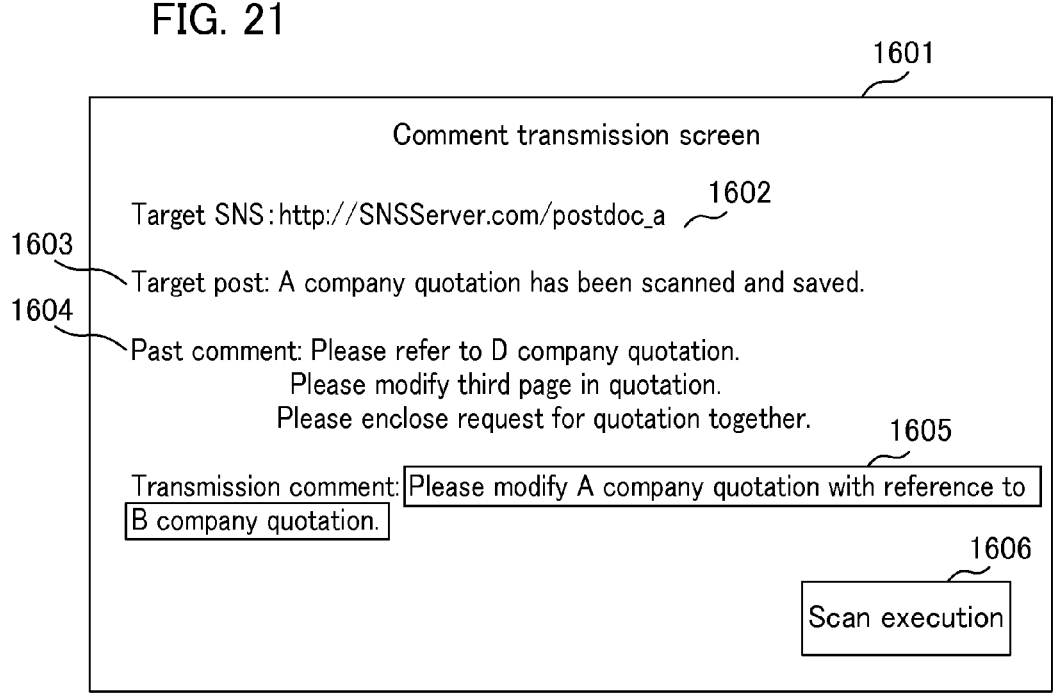
FIG. 21 is a display example of a comment transmission screen.

FIG. 21 is a display example of the comment transmission screen. The comment transmission screen functions as an input screen for the comment about the posted content. The image forming apparatus 101 displays following information on the input screen, specifically, the comment transmission screen 1601. The image forming apparatus 101 displays the SNS site USL of the comment transmission destination set in the comment ticket selected on the comment ticket display screen 1501, the posted content, the past comment(s) (a comment history) acquired in S504, and the transmission comment. A reference numeral 1602 indicates the SNS site URL. A reference numeral 1603 indicates the posted content. A reference numeral 1604 indicates the past comment. A reference numeral 1605 indicates the transmission comment display column.

When the user selects one comment from among the past comments 1604, its content is displayed on the transmission display column 1605. The user can further edit (input) the comment displayed on the transmission display column 1605 so as to set another transmission comment.

Returning to FIG. 19, in S506, the user presses the scan transmission button 1606 on the comment transmission screen. In S507, the image forming apparatus 101 executes a scan, and registers the scanned document with the document management site 102 by using the storage destination URL set in the comment ticket.

In S508, the URL information generating unit 406 of the document management site 102 generates a URL of the scanned document registered in S507, and transmits it to the image forming apparatus 101. By the URL of the scanned document, a storage location inside the document management site 102 of the scanned document is specified (that is, the URL of the scanned document is an example of the document URL). The URL of the scan document is used for display of the scan document by the SNS site 103.

In S509, the image forming apparatus 101 transmits, to the SNS site 103, the document URL received in S508 and the comment set in S505 by using the SNS post URL set in the comment ticket. The user who has transmitted the comment is a login user to the SNS site who is associated with the user who logged into the image forming apparatus 101. A display example after the comment transmission is shown in FIG. 16.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-080248, filed Apr. 8, 2013 which is hereby incorporated by reference herein in its entirety.

What is claimed is:

1. A document management system comprising an image processing apparatus and a management device that communicates with the image processing apparatus through a network, wherein the management device comprises:
a first processor that executes first code; and
a first memory storing the first code,
wherein the first processor executes the first code to control to:
automatically acquire first information relating to a content posted to an information sharing site, wherein the first information includes a comment transmission destination of the information sharing site, the comment transmission destination indicating a destination to which a comment about the posted content is transmitted from the image processing apparatus, and wherein the information sharing site is different from the management device;
automatically generate, based on the automatically acquired first information, a ticket including a storage destination and the comment transmission destination, wherein the storage destination indicates a destination of the management device to which an electronic document is transmitted from the image processing apparatus, and wherein the ticket includes control information for, when the ticket is selected by the user of the image processing apparatus, causing the image processing apparatus to transmit an electronic document to the management device identified based on the selected ticket and causing the image processing apparatus to transmit a comment about the posted content and document specifying information for specifying the electronic document to the comment transmission destination of the information sharing site identified based on the selected ticket;
transmit the generated ticket to the image processing apparatus;
register an electronic document received from the image processing apparatus based on the storage destination included in the ticket;
generate second information that is a URL (Uniform Resource Locator) used for specifying the registered electronic document; and
transmit the generated second information to the image processing apparatus, and
wherein the image processing apparatus comprises:
a second processor that executes second code; and
a second memory storing the second code,
wherein the second processor executes the second code to control to:
display the ticket received from the management device;
receive a selection of the displayed ticket based on an operation of a user;
generate the electronic document;
transmit the generated electronic document to the management device based on the storage destination included in the selected ticket;
receive the second information from the management device after the transmitting of the generated electronic document to the management device; and
transmit a comment and the received second information to the information sharing site based on the comment transmission destination included in the selected ticket.

2. The document management system according to claim 1, wherein the ticket is generated according to a user instruction input through an information processing apparatus or the image processing apparatus that has acquired the first information relating to the content posted to the information sharing site and displayed the first information relating to the posted content, the posted content including a shared electronic document.

3. The document management system according to claim 1, wherein the management device automatically generates the ticket for each predetermined period of time that the first information is automatically acquired.

4. The document management system according to claim 1, wherein the electronic document is generated by scanning a document with a scanner.

5. The document management system according to claim 1, wherein the comment is input via an input screen.

6. A management device that communicates with an image processing apparatus via a network, comprising:
a processor that executes code; and
a memory storing the code,
wherein the processor executes the code to control to:
automatically acquire first information relating to a content posted to an information sharing site, wherein the first information includes a comment transmission destination of the information sharing site, the comment transmission destination indicating a destination to which a comment about the posted content is transmitted from the image processing apparatus, and wherein the information sharing site is different from the management device;

automatically generate, based on the automatically acquired first information, a ticket including a storage destination and the comment transmission destination, wherein the storage destination indicates a destination of the management device to which an electronic document is transmitted from the image processing apparatus, and wherein the ticket includes control information for, when the ticket is selected by the user of the image processing apparatus, causing the image processing apparatus to transmit an electronic document to the management device identified based on the selected ticket and causing the image processing apparatus to transmit a comment about the posted content and document specifying information for specifying the electronic document to the comment transmission destination of the information sharing site identified based on the selected ticket;

transmit the generated ticket to the image processing apparatus;

register an electronic document received from the image processing apparatus based on the storage destination included in the ticket, wherein the image processing apparatus transmits the electronic document to the management device if the transmitted ticket, which is displayed by the image processing apparatus, is selected via a display based on an operation of a user of the image processing apparatus;

generate second information that is a URL (Uniform Resource Locator) used for specifying the registered electronic document; and transmit the generated second information to the image processing apparatus, wherein the image processing apparatus receives the second information from the management device after the transmitting of the generated electronic document to the management device and transmits a comment and the received second information to the information sharing site based on the comment transmission destination included in the selected ticket.

7. A document management method in a system comprising an image processing apparatus and a management device that communicates with the image processing apparatus via a network, the method comprising:

automatically acquiring, by a first processor of the management device, first information relating to a content posted to an information sharing site, wherein the first information includes a comment transmission destination of the information sharing site, the comment transmission destination indicating a destination to which a comment about the posted content is transmitted from the image processing apparatus, and wherein the information sharing site is different from the management device;

automatically generating, by the first processor of the management device, based on the automatically acquired first information, a ticket including a storage destination and the comment transmission destination, wherein the storage destination indicates a destination of the management device to which an electronic document is transmitted from the image processing apparatus, and wherein the ticket includes control information for, when the ticket is selected by the user of the image processing apparatus, causing the image processing apparatus to transmit an electronic document to the management device identified based on the selected ticket and causing the image processing apparatus to transmit a comment about the posted content and document specifying information for specifying the electronic document to the comment transmission destination of the information sharing site identified based on the selected ticket;

transmitting, by the first processor of the management device, the generated ticket to the image processing apparatus;

displaying, by a second processor of the image processing apparatus, the ticket received from the management device;

receiving, by the second processor of the image processing apparatus, a selection of the displayed ticket based on an operation of a user;

generating, by the second processor of the image processing apparatus, an electronic document;

transmitting, by the second processor of the image processing apparatus, the generated electronic document to the management device based on the storage destination included in the selected ticket;

registering, by the first processor of the management device, the electronic document received from the image processing apparatus based on the storage destination included in the ticket;

generating, by the first processor of the management device, second information that is a URL (Uniform Resource Locator) used for specifying the registered electronic document;

transmitting, by the first processor of the management device, the generated second information to the image processing apparatus;

receiving, by the second processor of the image processing apparatus, the second information from the management device; and transmitting, by the second processor of the image processing apparatus, a comment and the received second information to the information sharing site based on the comment transmission destination included in the selected ticket.

8. A non-transitory storage medium on which is stored a computer program for making a computer execute a document management method in a system comprising an image processing apparatus and a management device that communicates with the image processing apparatus via a network, the program comprising:

code for automatically acquiring, by the management device, first information relating to a content posted to an information sharing site, wherein the first information includes a comment transmission destination of the information sharing site, the comment transmission destination indicating a destination to which a comment about the posted content is transmitted from the image processing apparatus, and wherein the information sharing site is different from the management device;

code for automatically generating, by the management device, based on the automatically acquired first information, a ticket including a storage destination and the comment transmission destination, wherein the storage destination indicates a destination of the management device to which an electronic document is transmitted from the image processing apparatus, and wherein the ticket includes control information for, when the ticket is selected by the user of the image processing apparatus, causing the image processing apparatus to transmit an electronic document to the management device identified based on the selected ticket and causing the image processing apparatus to transmit a comment about the posted content and document specifying information for specifying the electronic document to the comment transmission destination of the information sharing site identified based on the selected ticket;

code for transmitting, by the management device, the generated ticket to the image processing apparatus;

code for displaying, by the image processing apparatus, the ticket received from the management device;

code for receiving, by the image processing apparatus, a selection of the displayed ticket based on an operation of a user;

code for generating, by the image processing apparatus, an electronic document;

code for transmitting, by the image processing apparatus, the generated electronic document to the management device based on the storage destination included in the selected ticket;

code for registering, by the management device, the electronic document received from the image processing apparatus based on the storage destination included in the ticket;

code for generating, by the management device, second information that is a URL (Uniform Resource Locator) used for specifying the registered electronic document;

code for transmitting, by the management device, the generated second information to the image processing apparatus;

code for receiving, by the image processing apparatus, the second information from the management device; and code for transmitting, by the image processing apparatus, a comment and the received second information to the information sharing site based on the comment transmission destination included in the selected ticket.

* * * * *